(12) United States Patent
Gaegauf et al.

(10) Patent No.: US 7,715,942 B2
(45) Date of Patent: May 11, 2010

(54) METHOD FOR CONTROLLING A MOVABLE TOOL, INPUT DEVICE AND MACHINE TOOL

(75) Inventors: Alfred Gaegauf, Wattenwill (CH); Martin Abbuehl, Thun (CH)

(73) Assignee: Fritz Studer AG (CH)

( * ) Notice: Subject to any disclaimer, the term of this patent is extended or adjusted under 35 U.S.C. 154(b) by 149 days.

(21) Appl. No.: 11/965,977

(22) Filed: Dec. 28, 2007

(65) Prior Publication Data
US 2008/0177413 A1 Jul. 24, 2008

(30) Foreign Application Priority Data
Jan. 18, 2007 (EP) .................. 07405014

(51) Int. Cl.
*G05B 11/01* (2006.01)
*G05B 15/00* (2006.01)
*G06F 19/00* (2006.01)

(52) U.S. Cl. .................. 700/186; 700/17; 700/83; 700/187; 700/190

(58) Field of Classification Search .......... 700/17, 700/83, 86–87, 164, 186–187, 190
See application file for complete search history.

(56) References Cited

U.S. PATENT DOCUMENTS

| 4,501,092 | A | * | 2/1985 | Archibald | 451/5 |
| 4,873,793 | A | * | 10/1989 | Asano et al. | 451/5 |
| 4,963,805 | A | * | 10/1990 | Suzuki et al. | 318/569 |
| 5,779,749 | A | * | 7/1998 | Nafziger | 65/29.11 |
| 6,234,869 | B1 | | 5/2001 | Kobayashi et al. | 451/5 |

OTHER PUBLICATIONS

EP Search Report dated Sep. 27, 2007 issued in corresponding European Application No. EP 07 40 5014 filed Jan. 18, 2007.

* cited by examiner

*Primary Examiner*—Ronald D Hartman, Jr.
(74) *Attorney, Agent, or Firm*—Ostrolenk Faber LLP

(57) ABSTRACT

In the method for controlling a movable tool, in particular a grinding tool, by means of a feed function that specifies the movement of the tool in time in at least one axis, an initial feed function in the form of at least one initial feed curve (29) is displayed on a monitor. From the initial feed function and from inputs effected by means of a pointing device, a feed function is calculated and displayed as a modified initial feed curve on the monitor. Control commands for moving the tool are produced from the feed function. The input of the feed function is simplified and rendered more flexible.

21 Claims, 5 Drawing Sheets

METHOD FOR CONTROLLING A MOVABLE TOOL, INPUT DEVICE AND MACHINE TOOL

FIELD OF THE INVENTION

The present invention concerns a method for controlling a movable tool, an input device for implementing such a method, and a machine tool having such an input device.

BACKGROUND OF THE INVENTION

Machine tools that allow precise machining of a workpiece by moving the tool in a controlled manner are known. The position of the tool in time is defined here by the feed function, which is to be specified corresponding to the desired workpiece geometries. However, only relatively simple feed functions can be specified. In the case of grinding machines, for example, by turning potentiometers the operator is able to define values for different positions of the grinding wheel, such as contact position, where the grinding wheel meets the workpiece, changeover position, where the removal of material by semi-finishing commences, and final position, where the grinding wheel has reached the finished size, as well as values for the particular travel speed of the grinding wheel between two positions.

Furthermore, specification of the feed function is aggravated by the fact that errors may easily occur when entering values, and by the fact that the exact determination of the individual values requires the operator to have a certain level of experience in order to achieve the desired accuracies in the machined workpiece.

SUMMARY OF THE INVENTION

Starting from this prior art, the aim of the present invention is to simplify the input of a feed function and to render it more flexible, and to specify a method, an input device and a machine tool that permit such an improved input of the feed function.

This aim is achieved by a method for controlling a movable tool by means of a feed function that specifies the movement of the tool in time in at least one axis, by an input device for implementing such a method, and by a machine tool comprising such an input device.

The method according to the invention comprises the steps of:
- displaying an initial feed function in the form of at least one initial feed curve on a monitor;
- calculating a feed function from the initial feed function and from inputs effected by means of a pointing device;
- displaying the feed function as a modified initial feed curve on the monitor; and
- producing control commands for moving the tool from the feed function.

The method according to the invention and the input device and machine tool according to the invention have inter alia the advantage that even complicated feed functions can be entered in a simple and reliable manner without the operator having to carry out complex programming. The invention is based inter alia on the knowledge that it is easier for the operator to comprehend and assess the course of the machining process from a graphical representation of the feed function, and not from individual numeric values.

BRIEF DESCRIPTION OF THE DRAWINGS

The invention is explained below by means of a preferred exemplary embodiment with reference to Figures, in which.

DETAILED DESCRIPTION OF THE PREFERRED EMBODIMENTS

Figure 1:
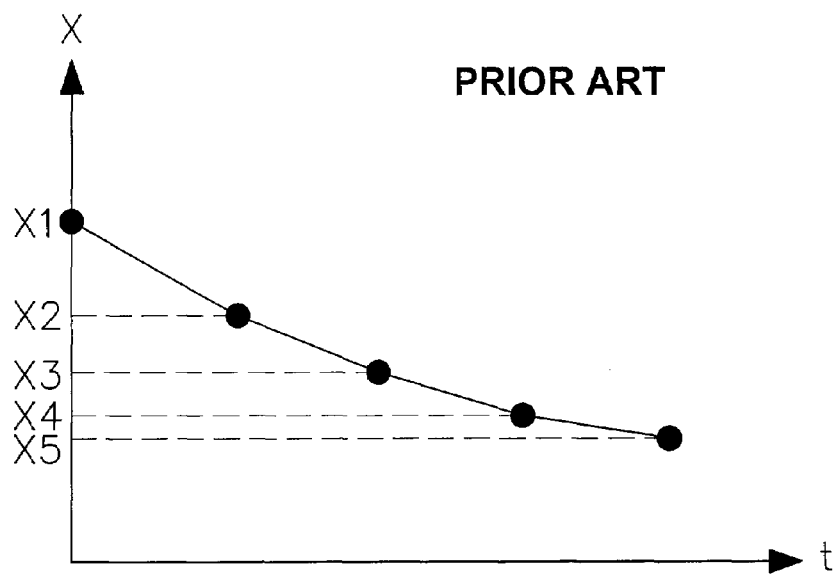
FIG. 1 shows a graph of a known type of feed function.

FIG. 1 shows a graph of a known type of feed function. The abscissa t corresponds to the time axis, the ordinate X specifies the position of the tool on the X-axis.

To determine the feed function, individual values are specified for the position of the tool X1, X2, X3, X4, X5 and the respective travel speed V1, V2, V3, V4 at which the tool is to be moved between the respective positions, i.e. between X1 and X2, X2 and X3, X3 and X4, and X4 and X5. If the tool is, for example, a grinding wheel, then X1 corresponds for example, to the contact position, where the tool meets the workpiece surface, X2 corresponds to a first change-over position, from which material is removed by rough-machining, X3 corresponds to a second change-over position, from which the material removal is effected by semi-finishing, X4 corresponds to a third change-over position, from which fine-finishing commences and X5 corresponds to the final position, where the tool reaches the finished size. The travel speeds V1, V2, V3, V4 are each constant, so that the feed of the tool between the positions is effected linearly. As is apparent from FIG. 1, a feed function, which is composed of individual straight lines, is produced in the graph. The particular inclination of a section corresponds here to the travel speed V1, V2, V3 and V4 respectively.

Figure 2:
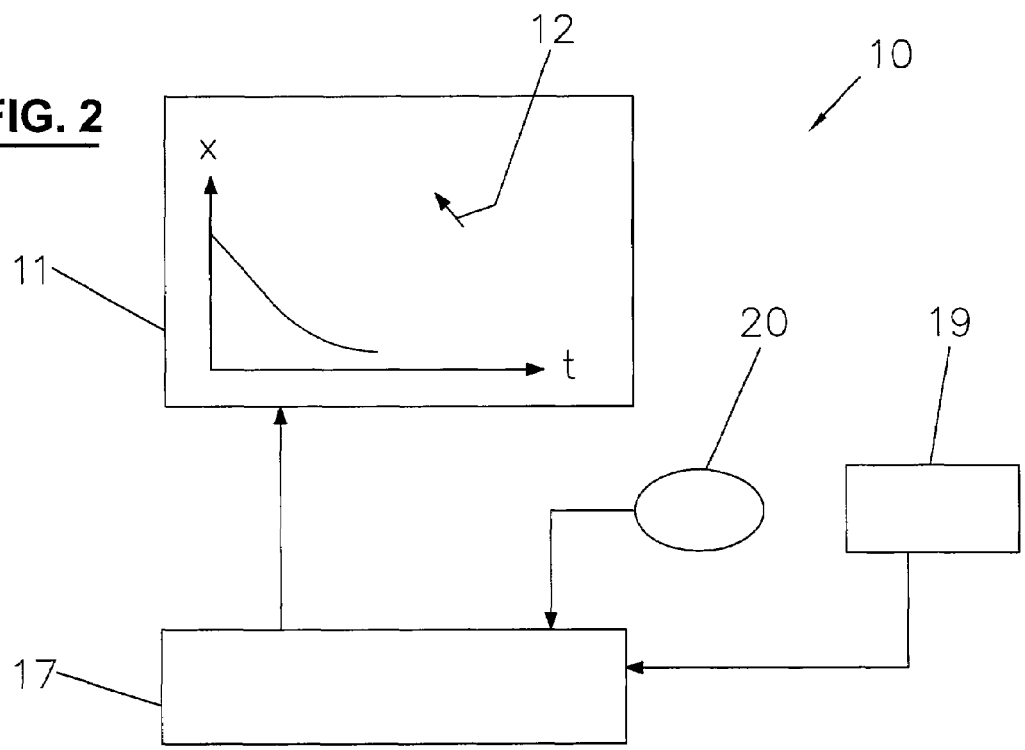
FIG. 2 shows schematically an input device for generating a feed function.

FIG. 2 shows schematically an input device 10, by means of which a feed function can be generated and which comprises a monitor 11, a computer 17, a keyboard 19 and a pointing device 20 in the form of a computer mouse.

The pointing device 20 serves for controlling a monitor cursor 12, in order, for example, to mark certain points or areas or to select menu elements. By moving the pointing device 20, the position of the monitor cursor 12 is correspondingly altered.

The computer 17 is of conventional design and for data processing contains a central processing unit (CPU) and a memory, for example, in the form of a random access memory (RAM) and/or a hard disc. During operation, the computer 17 receives data from the pointing device 20 and optionally from the keyboard 19, evaluates the data and generates monitor signals that are received by the monitor 11. For that purpose, the computer 17 contains a suitable graphics program for evaluating the data from the pointing device 20 and from the keyboard 19 and for generating monitor signals, which cause the feed function to be represented in the form of a curve on the monitor 11.

The feed function defines the movement in time of a tool, wherein for each axis along which the tool is movable under control a feed curve is to be set. If, for example, the tool is movable along the X, Y and Z axes, the feed function represents a trivalent function (X(t)Y(t), Z(t)). In the case of a more simple control, the movement of the tool along fewer than three axes is definable, so that only one feed curve, e.g. X(t), or two feed curves e.g. X(t) and Z(t) need to be entered.

As a rule, several processing steps are required to complete a workpiece having the desired geometry. For example, different areas on the workpiece are ground incrementally, such as cylindrical faces, left and right shoulders, screw threads etc., by moving the grinding wheel in a suitable manner (longitudinal grinding, plunge grinding, etc.). In the case of the method described here, every possible machining step is characterised by a basic feed function, which can be specified on the basis of empirical values. So that the graphics program is able to access the basic feed functions, these are combined in a collection, which is contained in the memory of the computer 17. Instead of such a collection or to supplement it, the graphics program may include a modelling area by means of which the computer 17 models the particular basic feed function on the basis of entered data.

Figure 3:
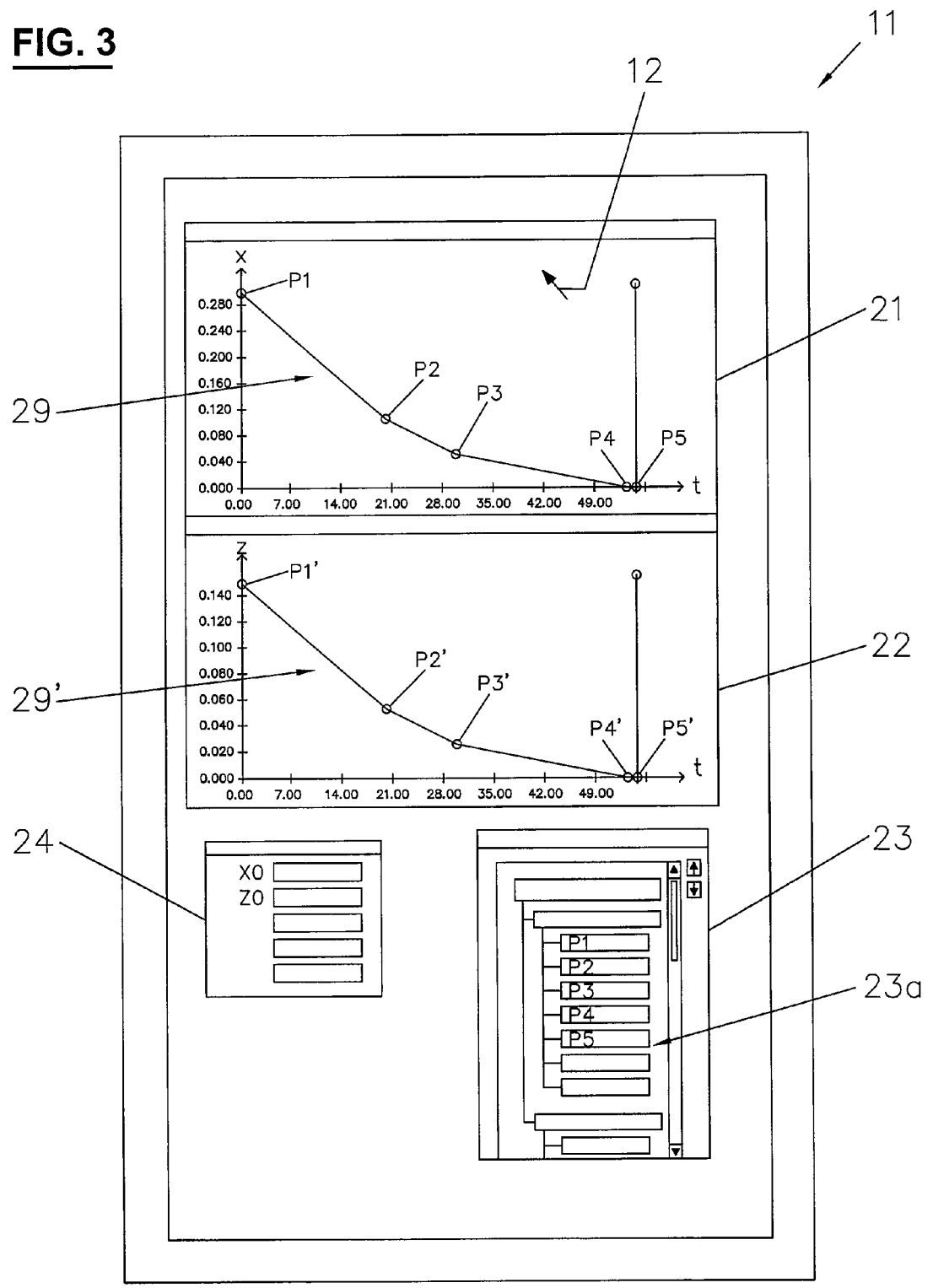
FIG. 3 shows schematically a monitor with a graph of feed functions.

The input of the feed function for a tool in the form of a grinding wheel movable under control in the X and Z axes is explained below. FIG. 3 shows schematically a monitor 11 with various opened windows 21-24.

The current feed function in the form of feed curves 29, 29' is shown in windows 21 and 22. The abscissa t of the respective feed curve 29, 29' corresponds to the time axis, the ordinate gives the position of the tool on the X-axis and Z-axis respectively. The zero point on the X-axis and Z-axis corresponds to the final position at which the tool has reached the finished size.

The window 23 shows a selection menu listing the possible processing steps. An individual processing step is, for example, characterised by the following parameters: the nature of the grinding wheel to be used, the type of surface to be processed (e.g. left shoulder, right shoulder etc.) and the way in which the grinding wheel is to be advanced (e.g. straight plunge grinding, angular plunge grinding, etc.). Information relating to these parameters is given in fields 23a of the selection menu. By operating the pointing device 20, the operator can select the desired processing step.

The window 24 contains the input boxes in which the operator can enter data using the keyboard 19, inter alia the dimensions for the workpiece area to be machined, like the initial dimension and the desired finished dimension.

After selecting the processing step, the graphics program accesses the basic feed function in the collection corresponding to the machining step, adopts this as the initial feed function and generates monitor signals, which reproduce the initial feed function in the form of an initial feed curve 29, 29' in the windows 21 and 22 respectively of the monitor 11. The curves 29 and 29' in FIG. 3 show by way of example for the machining process of angular plunge grinding the initial feed curves for the advancement of the grinding wheel in the X-axis and Z-axis respectively. In this example, the points P1-P5 and P1'-P5' on the initial feed curves 29, 29' mark the following chronological events in the machining:

P1, P1': The grinding wheel is disposed in the starting position. After the time t=0, the grinding wheel is moved towards the workpiece until it meets its surface and commences rough-machining.

P2, P2': The machining changes from rough-machining to semi-finishing.

P3, P3': The machining changed from semi-finishing to fine-finishing.

P4, P4': Spark-out phase commences.

P5, P5': The grinding wheel is lifted from the workpiece.

Figure 4:
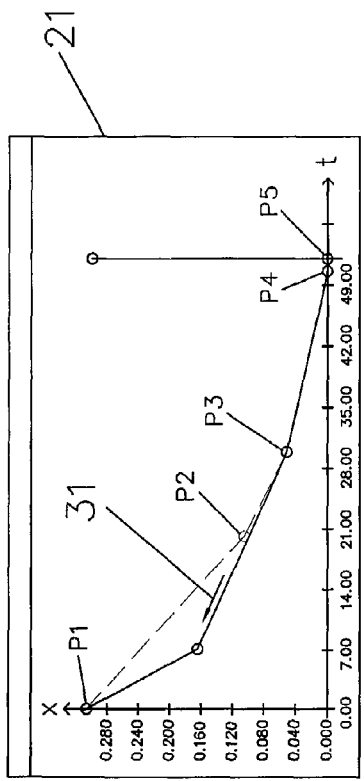
FIGS. 4 to 7 show different examples of graphical modifications of a feed curve.

By operating the pointing device 20, the initial feed curve 29, 29' can now be modified. The graphics program is designed so that different options for modification are available. Four examples of possible modifications are shown in FIGS. 4-7, the initial feed curve in each case being shown as a broken line and the modified curve being shown as a solid line:

A point, e.g. P2, is marked and displaced, the following points being displaced with it (cf. FIG. 4). The arrow 31 indicates the direction in which the monitor cursor is displaced by operating the pointing device 20.

Figure 5:
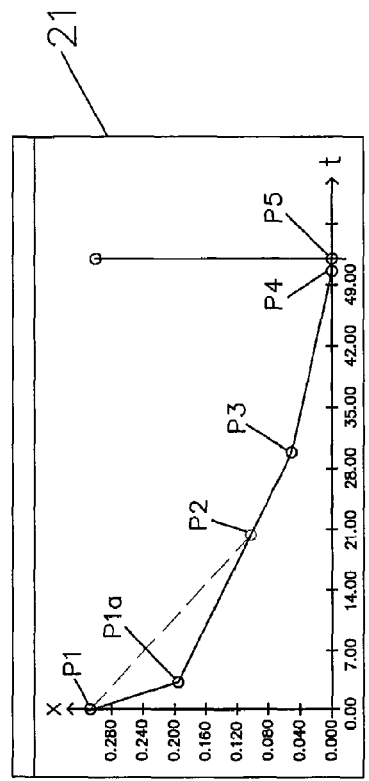

A point, e.g. P2, is marked and displaced, the following points remaining unchanged (cf. FIG. 5).

Figure 6:
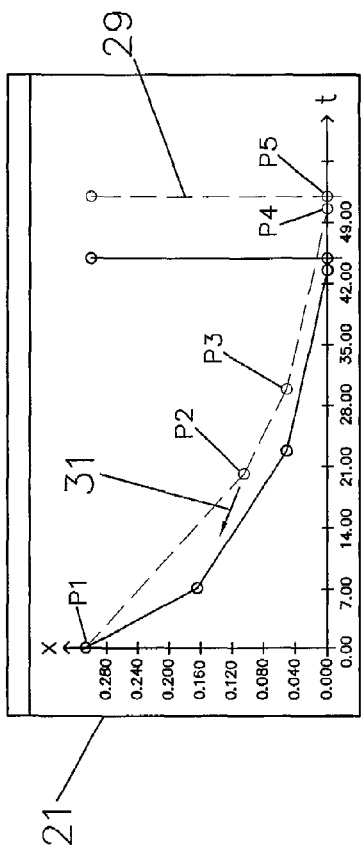

A point, e.g. P2, is marked and deleted (cf. FIG. 6).

Figure 7:
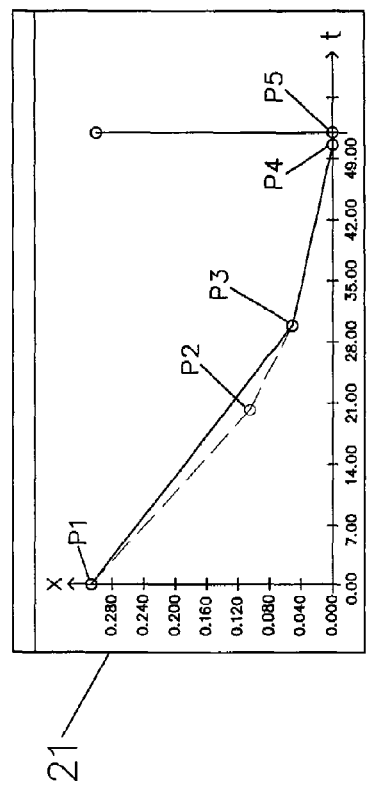

A point P1a is added (cf. FIG. 7).

To select the type of modification, the keyboard 19 is used in addition to the pointing device 20. It is also possible to design the graphics program so that the type of modification can only be selected by operating the pointing device 20, by, for example, displaying a selection menu on the monitor 11.

In FIGS. 3-8 the feed curve between the points P1-P5 and P1'-P5' runs in each case linearly, the co-ordinates of the added points P1a, P2a, P1a', P2a' being specified by the operator. Optionally, the graphics program can be designed so that the computer 17 calculates the co-ordinates of additional points, for example, by using spline functions. If this option is provided, then the operator is able to mark the points of the initial feed curve 29, 29' lying in a specific time period. The computer 17 then calculates a modified initial feed function by laying a spline function through the marked points, which is then displayed on the monitor 11 in the form of a polygon function with a specific number of points.

Figure 8:
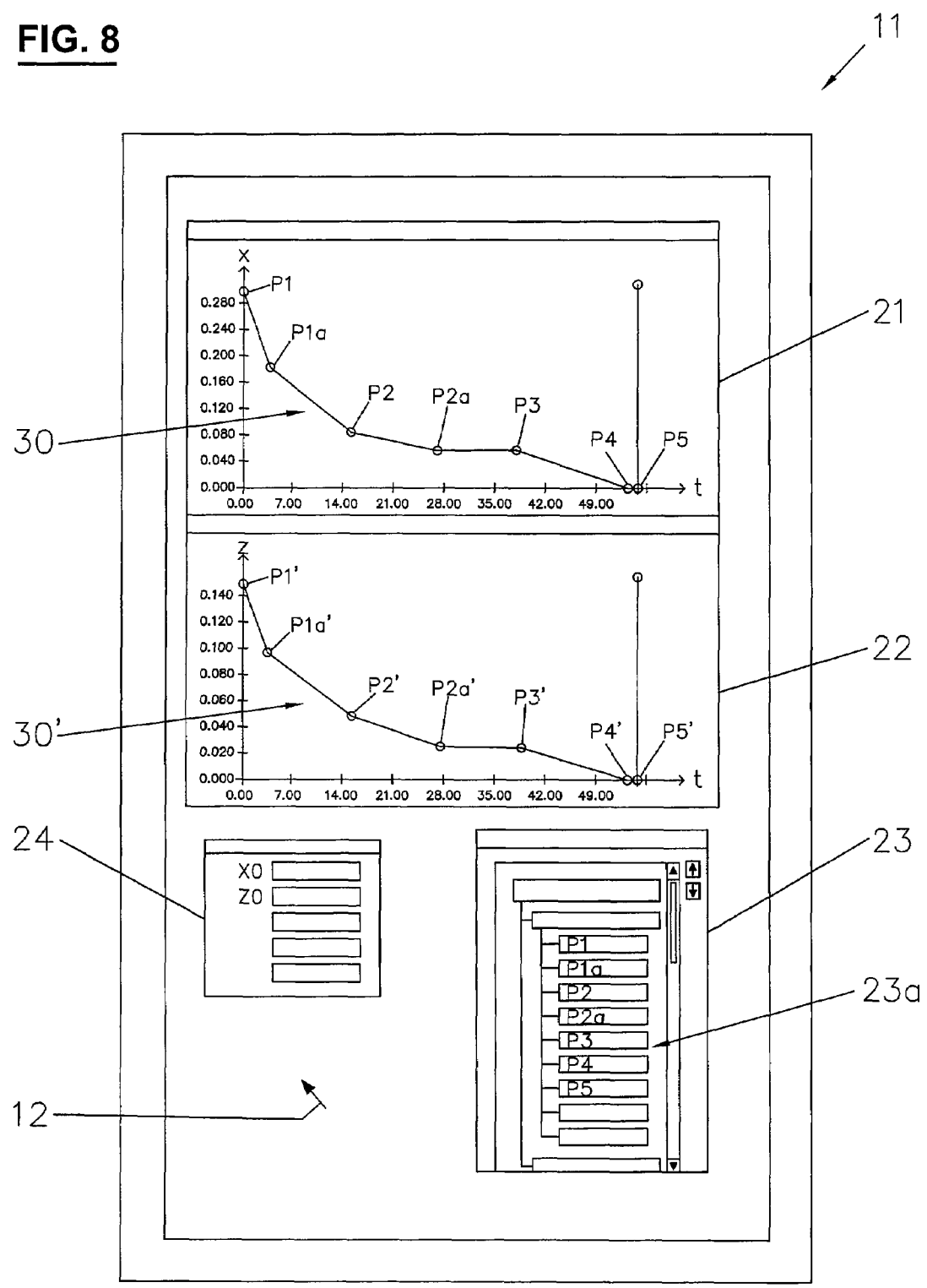
FIG. 8 shows the monitor according to FIG. 3 with modified feed curves.

By applying the different types of modification successively, the operator is able to adapt the initial feed curve 29, 29' until it corresponds to the desired feed curve. FIG. 8 shows the monitor 11 of FIG. 3 with the modified feed curves 30 and 30'. In this example, on the feed curve 30 the points P2 and P3 were displaced and the points P1a and P2a were added. Thus, rough-grinding is provided between the points P1 and P1a, and a first spark out between the points P2a and P3, before the finish. Data relating to the added points P1a and P2a is automatically displayed by the graphics program in the boxes 23a of the selection menu.

In the present example, the tool is movable in two axes, the three-dimensional movement being time linked corresponding to the selected processing step. If, for example, plunge grinding at an angle of 45 degrees is to be effected, then the movement in the X-axis corresponds to the movement in the Z-axis.

The graphics program is designed so that it takes into account the time linking of the axes corresponding to the selected processing step. If the operator therefore modifies, for example, in window 21 the initial feed curve 29, then the initial feed curve 29' in window 22 is modified automatically at the same time. In the example according to FIG. 8, the graphics program has caused the points P2' and P3' to be displaced during modification of the initial feed curve 29 in window 21 and the points P1a' and P2a' to be added.

If modification of the feed curves 30, 30' has ended, the computer 17 generates a control program, which comprises control commands for moving the tool and which can be imported into the control unit of the tool.

In the example shown here, the X-co-ordinates of the point P1 and the Z-co-ordinates of P1' are preset by the basic feed function. The values for these co-ordinates are selected to be sufficiently large that during the customary machining processes the grinding wheel meets the workpiece surface only after the time t=0, for example, X=0.3 mm and Z=0.15 mm at t=0. If a workpiece is to be machined where there is too large a difference between rough dimension and finished dimension and consequently the grinding wheel would contact the workpiece before the time t=0, the operator can adapt the initial curve 29 and 29' respectively using the above-mentioned modification options so that the grinding wheel does not meet the workpiece surface until after t=0.

As mentioned above, it is also possible to provide the graphics program with a modelling area. This may be designed, for example, so that the computer determines an initial feed function from the basic feed function and from the entered geometric data.

Figure 9:
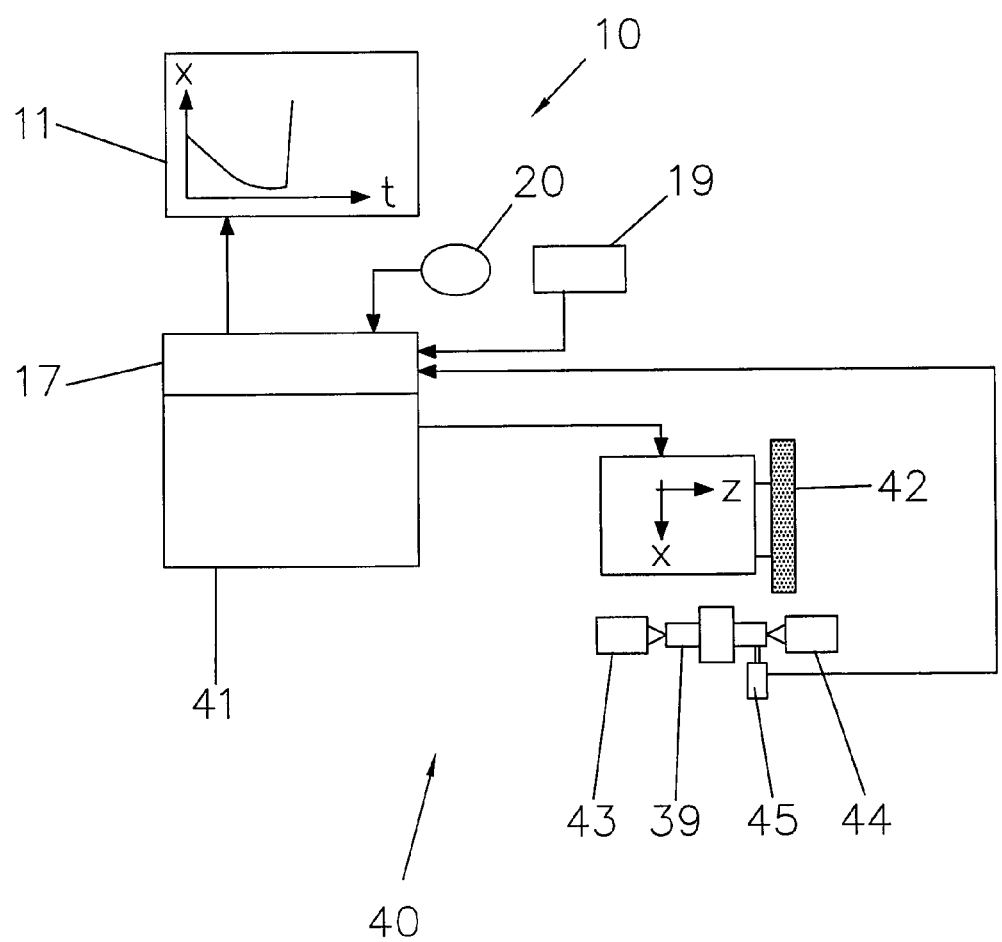
FIG. 9 shows a machine tool with an input device according to FIG. 2.

FIG. 9 shows an exemplary embodiment of a machine tool 40, in which the input device 10 comprising monitor 11, computer 17, keyboard 19 and pointing device 20 is integrated. The machine tool 40 is in the form of a circular grinder and comprises in addition to the grinding wheel as tool 42 a control unit 41 as well as a workpiece headstock 43 and a tailstock 44 for holding and driving a workpiece 39 to be machined. The grinding wheel 42 is rotatable about the grinding axis and movable in the X and Z directions. The control unit 41 is connected to the movable tool 42 and together with the computer 17 forms a CNC control unit. As explained above, the zero point of the feed function is at the finished dimension. The CNC control unit is set up so that it generates a control program from the preset feed function and the geometric data entered in the window 24 of the monitor 11, and this control program results in such a movement of the tool 42 in space that it reaches the finished dimension at the correct place in relation to the workpiece surface.

The machining process is started by entering a confirmation signal. Using the control program, the control unit 41 generates control signals, which are received by the tool 42 so that this is moved correspondingly along the axes and machines the workpiece 39.

Optionally, the machine tool 40 comprises a measuring device 45 connected to the computer 17, by which measured variables, such as diameter and specific lengths are ascertainable on the workpiece 39 during machining of the workpiece 39. The measured variables ascertained are stored in the computer 17 and for the particular axis are displayed on the monitor 11 as an actual curve together with the feed curve. The actual curve reproduces, for example, the chronological sequence of the workpiece diameter. The entered feed curve corresponds to the desired curve. By comparing the actual curve and the desired curve the operator can assess whether the machining of the workpiece can be further optimised, for example, in respect of time and/or quality.

Optionally, the measuring device 45 is part of a control loop, by means of which variations of the actual values from the desired values during the manufacturing process are corrected.

The method described so far, the input device and the machine tool have inter alia the following advantages:

The input of the feed function is facilitated by the graphics display and the possibility of modifying the graphics. The modification can be effected by means of the pointing device, so that the operator need not enter any figures and therefore the risk of faulty keying is reduced.

Virtually any feed functions can be entered. Compared with the feed function, as illustrated in FIG. 1 for example, any number of changeover points can be defined.

From the preceding description, countless modifications are available to the expert without departing from the protective scope of the invention, which is defined by the claims. Thus, instead of the computer mouse or to supplement it, the following pointing devices can be used: touchscreen, trackball, touchpad. Thus, for example, the monitor 11 can be in the form of a touchscreen, in which case the feed curve is modified graphically through the operator guiding a stylus or one of his fingers over the touchscreen.

Instead of a grinding wheel, the method described here for entering a feed function may also be used in the case of other types of tools, such as a lathe tool or a milling tool.

The input device 10 does not have to be integrated in the machine tool 40, but may also be in the form of a separate station. In that case, the control program generated is transferred via a connecting line or by means of a data medium, for example, a diskette, to the control unit 41 of the machine tool 40.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for controlling a movable tool to machine a workpiece, the method comprising the steps of:
    displaying on a monitor an initial feed function of the tool in a form of a first graphical representation in the shape of at least one curve;
    calculating a second feed function from said initial feed function and from inputs effected by a pointing device, wherein said second feed function specifies movement of said tool in time along at least one axis toward and away from said workpiece;
    displaying said second feed function on said monitor in the form of a second graphical representation in the shape of at least one modified curve;
    producing control commands for moving said tool from said second feed function; and
    moving said tool along said at least one axis based on said control commands, wherein said moving of said tool machines said workpiece.

2. The method according to claim 1, wherein said pointing device comprises at least one selected from a group consisting of a computer mouse, touchscreen, trackball, and touchpad.

3. The method according to claim 1, further comprising displaying said initial feed curve in a co-ordinate system with ordinate and abscissa, wherein one of the ordinate and abscissa corresponds to the time axis, and the other one of the ordinate and abscissa corresponds to the position of the tool along said at least one axis.

4. The method according to claim 1, wherein said inputs are effected additionally by means of a keyboard.

5. The method according to claim 1, further comprising calculating said initial feed function using a basic feed function that is selected from a collection of basic feed functions stored in a data memory, or by means of entered data, or by use of both.

6. The method according to claim 1, further comprising connecting said monitor and said pointing device to a computer, wherein said computer is programmed and configured to display said initial feed function, calculate said second feed function, display said second feed function and execute said control commands.

7. The method according to claim 1, further comprising acquiring by measuring measured variables representing dimensions of said workpiece during said machining of said workpiece.

8. The method according to claim 1, wherein the tool is movable along at least a first axis toward and away from said workpiece and a second axis in a direction transverse to the first axis.

9. The method according to claim 1, wherein said second feed function specifies the movement of said tool in time in a direction along at least a first axis and a second axis.

10. The method according to claim 9, further comprising displaying on said monitor said second graphical representation in the form of a third graphical representation in the shape of at least two curves after calculating said second feed function.

11. The method according to claim 1, wherein at least one of said first graphical representation and said second graphical representation comprises a plurality of points and a plurality of straight lines connecting two neighboring points.

12. The method according to claim 1, wherein the tool comprises a grinding tool, a lathe tool or a milling tool.

13. The method according to claim 1, further comprising modifying said second feed function after said workplace is machined according to said control commands to improve the machining of the workpiece.

14. A system for controlling a tool to machine a workpiece, the system comprising:
 a machine tool movable along at least one axis toward and away from said workpiece;
 a computing device operatively connected to said machine tool;
 a display monitor operatively connected to said computing device; and
 a pointing device operatively connected to said computing device, wherein said computing device is programmed and configured to:
  display on said monitor an initial feed function of the tool in a form of a first graphical representation in the shape of at least one curve;
  receive inputs by said pointing device and to calculate a second feed function from said initial feed function and from said inputs, wherein said second feed function specifies movement of said machine tool in time in said at least one axis or at least one other axis that intersects said at least one axis;
  display on said monitor said second feed function in the form of a second graphical representation in the shape of at least one modified curve;
  produce control commands for movement of said tool from said second feed function; and
  move said tool along said at least one axis to machine said workpiece based on said control commands.

15. The system according to claim 14, further comprising a headstock and a tailstock configured for holding and driving said workpiece to be machined, and wherein said machine tool includes a grinding wheel that is rotatable about a grinding axis and movable along said at least one axis.

16. The system according to claim 14, further comprising a measuring device for acquiring measured variables representing dimensions of said workpiece during machining of said workpiece and said computing device being configured to receive said measured variables and adjusting said second feed function based on said variables.

17. The system according to claim 14, further comprising at least one control unit configured for controlling said tool, wherein said computing device is operatively connected to said control unit.

18. The system according to claim 14, wherein said second feed function specifies the movement of said tool in time in at least a first axis toward and away from said workpiece and a second axis in a direction transverse to the first axis, and said computing device is configured and operable to cause said monitor to display said second graphical representation in the form of a third graphical representation in the shape of at least two curves after calculating said second feed function.

19. A computer readable medium storing instructions executed by a computer system to implement a method for controlling a movable machine tool to machine a workpiece, the method comprising:
 displaying on a monitor an initial feed function of the tool in the form of a first graphical representation in the shape of at least one curve;
 calculating a second feed function from said initial feed function and from inputs effected by a pointing device, wherein said second feed function specifies movement of said tool in time along at least one axis toward and away from said workpiece;
 displaying said second feed function on said monitor in the form of a second graphical representation in the shape of at least one modified curve;
 producing control commands for moving said tool from said second feed function; and
 moving said tool along said at least one axis based on said control commands, wherein said moving of said tool machines said workpiece.

20. A method for controlling a movable tool to machine a workpiece, the method comprising the steps of:
 storing on processor readable media a database that stores an initial feed function for said movable tool, wherein said initial feed function specifies first movement of said tool in time along at least one axis toward and away from said workpiece;
 selecting by a processor said initial feed function from the database;
 displaying on a display by said processor a first graphical representation of said initial feed function;
 receiving, by a selection device operated by a user, at least one input representing a modification to said initial feed function;
 calculating by said processor, as a function of said at least one input, a second feed function for said movable tool, wherein said second feed function specifies second movement of said tool in time along said at least one axis or along at least one other axis that intersects said at least one axis;
 displaying on said display by said processor a second graphical representation of said second feed function;
 providing control commands from said second feed function for moving said tool; and
 moving said tool along said at least one axis or along said at least one other axis based on said control commands, wherein said moving of said tool machines said workpiece.

21. The method according to claim 20, wherein the first and second graphical representations are provided in the form of curves.

* * * * *